(12) United States Patent
Takinaka

(10) Patent No.: US 8,914,059 B2
(45) Date of Patent: Dec. 16, 2014

(54) NEIGHBORING INFORMATION MANAGEMENT APPARATUS, NEIGHBORING INFORMATION MANAGEMENT SYSTEM AND METHOD THEREFOR

(75) Inventor: Yuusuke Takinaka, Tokyo (JP)

(73) Assignee: NEC Corporation, Tokyo (JP)

( * ) Notice: Subject to any disclaimer, the term of this patent is extended or adjusted under 35 U.S.C. 154(b) by 410 days.

(21) Appl. No.: 13/461,643

(22) Filed: May 1, 2012

(65) Prior Publication Data

US 2012/0309448 A1    Dec. 6, 2012

(30) Foreign Application Priority Data

Jun. 1, 2011 (JP) ................................. 2011-123006

(51) Int. Cl.
*H04W 24/00* (2009.01)
*H04W 36/00* (2009.01)

(52) U.S. Cl.
CPC ................................ *H04W 36/0083* (2013.01)
USPC ......... 455/525; 455/426.1; 455/436; 370/331

(58) Field of Classification Search
CPC .......................... H04W 36/0083; H04W 48/20
USPC ....................................................... 455/525
See application file for complete search history.

(56) References Cited

U.S. PATENT DOCUMENTS

| | | | | |
|---|---|---|---|---|
| 6,556,822 | B1 * | 4/2003 | Matsumoto | 455/421 |
| 6,871,071 | B2 * | 3/2005 | Takao et al. | 455/436 |
| 7,317,709 | B2 * | 1/2008 | Jang et al. | 370/331 |
| 8,213,939 | B2 * | 7/2012 | Iwamura et al. | 455/436 |
| 8,219,086 | B2 * | 7/2012 | Venkatachalam et al. | 455/434 |
| 8,259,678 | B2 * | 9/2012 | Jung et al. | 370/331 |
| 8,270,975 | B2 * | 9/2012 | Kim et al. | 455/436 |
| 8,457,065 | B2 * | 6/2013 | Oguchi | 370/331 |
| 8,457,638 | B2 * | 6/2013 | Iwamura et al. | 455/436 |
| 8,639,238 | B2 * | 1/2014 | Kobayashi et al. | 455/423 |
| 8,681,756 | B2 * | 3/2014 | Lin et al. | 370/338 |
| 8,707,045 | B2 * | 4/2014 | Han et al. | 713/171 |
| 8,743,832 | B2 * | 6/2014 | Jung et al. | 370/331 |
| 2004/0185855 | A1 * | 9/2004 | Storm et al. | 455/445 |
| 2006/0146752 | A1 * | 7/2006 | Jang et al. | 370/331 |
| 2009/0109925 | A1 * | 4/2009 | Nakamura et al. | 370/331 |
| 2009/0190555 | A1 * | 7/2009 | Oguchi | 370/331 |
| 2009/0233601 | A1 * | 9/2009 | Vikberg et al. | 455/436 |

(Continued)

FOREIGN PATENT DOCUMENTS

JP    2009-060449 A    3/2009
JP    2009-182549 A    8/2009

OTHER PUBLICATIONS

European Search Report dated Sep. 12, 2012.

*Primary Examiner* — Hai V Nguyen
(74) *Attorney, Agent, or Firm* — McGinn IP Law Group, PLLC

(57) ABSTRACT

A neighboring information management apparatus situated at higher position than a plurality of base stations and obtains a message from each of said plurality of base stations, including:
a number of times of performance total part totaling number of times of performance of uncontrolled hand over performed by a mobile terminal between base stations of which neighboring information are not registered, and
a neighboring information registration part registering serving base station and target base station which are in state of the uncontrolled hand over automatically as the neighboring information.

9 Claims, 7 Drawing Sheets

(56) References Cited

U.S. PATENT DOCUMENTS

| | | | |
|---|---|---|---|
| 2010/0173631 A1* | 7/2010 | Kim et al. ..................... 455/436 |
| 2010/0205442 A1* | 8/2010 | Han et al. ..................... 713/171 |
| 2010/0260142 A1* | 10/2010 | Jung et al. ..................... 370/331 |
| 2010/0267378 A1* | 10/2010 | Hamabe et al. ............... 455/423 |
| 2011/0003591 A1* | 1/2011 | Venkatachalam et al. .... 455/434 |
| 2011/0086634 A1* | 4/2011 | Rahman ........................ 455/423 |
| 2011/0090871 A1* | 4/2011 | Kim et al. ..................... 370/332 |
| 2011/0128945 A1* | 6/2011 | Lin et al. ....................... 370/338 |
| 2011/0292859 A1* | 12/2011 | So et al. ........................ 370/312 |
| 2012/0003975 A2* | 1/2012 | Hole .............................. 455/436 |
| 2012/0083281 A1* | 4/2012 | Watanabe et al. ............. 455/446 |
| 2012/0147852 A1* | 6/2012 | Ganapathy .................... 370/331 |
| 2012/0230305 A1* | 9/2012 | Barbu et al. ................... 370/338 |
| 2013/0023269 A1* | 1/2013 | Wang et al. ................... 455/436 |
| 2013/0059565 A1* | 3/2013 | Jung et al. ..................... 455/411 |
| 2013/0107812 A1* | 5/2013 | Lee et al. ...................... 370/328 |
| 2013/0170477 A1* | 7/2013 | Wi et al. ....................... 370/336 |

* cited by examiner

FIG.2

| TOTAL TIME | SERVING | TARGET | NUMBER OF TIMES OF PERFORMANCE OF UNCONTROLLED HO |
|---|---|---|---|
| 04:00 ~ 10:00 | STATION A | STATION B | 100 |
|  | STATION A | STATION C | 200 |
|  | STATION B | STATION C | 300 |
| 10:00 ~ 16:00 | STATION A | STATION B | 100 |
|  | STATION A | STATION C | 200 |
|  | STATION B | STATION C | 300 |
| 16:00 ~ 22:00 | STATION A | STATION B | 100 |
|  | STATION A | STATION C | 200 |
|  | STATION B | STATION C | 300 |
| 22:00 ~ 04:00 | STATION A | STATION B | 100 |
|  | STATION A | STATION C | 200 |
|  | STATION B | STATION C | 300 |

FIG.3

| SERVING BASE STATION | NEIGHBOR 1 | NEIGHBOR 2 | NEIGHBOR 3 | NEIGHBOR 4 |
|---|---|---|---|---|
| STATION A | STATION B | STATION C | STATION D | STATION E |
| STATION B | STATION A | STATION C | STATION D | |
| STATION C | STATION A | STATION B | STATION D | STATION F |

NEIGHBORING INFORMATION MANAGEMENT APPARATUS, NEIGHBORING INFORMATION MANAGEMENT SYSTEM AND METHOD THEREFOR

INCORPORATION BY REFERENCE

This application is based upon and claims the benefit of priority from Japanese patent applications No. 2011-123006, filed on Jun. 1, 2011, the disclosure of which is incorporated herein its entirety by reference.

BACKGROUND OF THE INVENTION

1. Field of the Invention

The present invention relates to neighboring information management apparatus, neighboring information management system and method therefore, and in particular, to method of management of information of neighboring base station.

2. Description of the Related Art

Today, users of mobile terminal are increasing due to spread of smart phone, and so on. Therefore, it is also required to supply a stable service for the mobile terminal when a user moves.

The neighboring information which is an important item for an area plan is planed on the basis of a distance between base stations and a direction of sector when the cell is planed. Since this method of plan is performed before establishment of a base station, it would not be possible to consider a user environment of an actual field.

Although a field measurement by vehicle is practiced for a confirmation of a user environment, the measurement is limited to data of course possible for the vehicle to measure, and so the measurement becomes a reproduction of a special user environment. Therefore, although it would be no problem for a measurement of a radio environment of a field, a reproduction of a movement of a mobile terminal such as a hand over (HO) would be difficult, and so the amount of data for examination of the neighboring information becomes insufficiency.

In addition, it is necessary to obtain time and cost to repeat driving the same route, and so on for obtaining statistical data. Although a measurement by walking or a measurement in indoor can reproduce further user environment compared with the measurement by vehicle, the course possible to measure would be limited often to special as same as the measurement by vehicle. Also in this case, precise reproduction of the user environment would be difficult, and then it would be necessary to obtain the user's data via network for the area plan.

Further, Uncontrolled HO is a movement by the mobile terminal to hand over with a target base station (destination station of the hand over) with transmission of RNG-REQ (Ranging Request) to the target base station without preparation phase of the hand over. However, there is a problem with the Uncontrolled HO that it requires more HO latency than a common hand over. Uncontrolled HO occurs regardless of registration of neighboring information between the serving station (source station of the hand over) and the target base station. However, if the neighboring information is registered, the number of the Uncontrolled HO can be reduced in comparison with the case it not registered.

The art regarding the Uncontrolled HO and the controlled HO is described in the Patent document 1 (the Japanese Patent Laid-Open No. 2009-182549) and the Patent document 2 (the Japanese Patent Laid-Open No. 2009-060449). The controlled HO is a hand over procedure in which the mobile terminal negotiates with the base station being connected and then it switches the base station when it moves.

On the other hand, the Uncontrolled HO is an urgent recovery procedure used when the communication between the mobile station and the base station being connected is cut off before the mobile station finishes the controlled HO. Then the Uncontrolled HO is a hand over procedure in which the mobile station is connected with the base station being possible to connect on the basis of the signal strength without a hand over procedure between the mobile station and the base station being connected.

The above-mentioned Uncontrolled HO occurs regardless of the registration of the neighboring information between the serving base station and the target base station. However, it is a problem for the Uncontrolled HO that the Uncontrolled HO requires more HO latency than a common hand over. On the other hand, the number of the Uncontrolled HO can be reduced more by the registration of neighboring information than by the non-registration of neighboring information.

SUMMARY

An exemplary object of the invention is to solve the above-mentioned problems and provide a neighboring information management apparatus, neighboring information management system and method therefor which can extract and register the neighboring information which has never been registered when the cell is planed.

An exemplary aspect of the invention is a neighboring information management apparatus situated at higher position than a plurality of base stations and obtains a message from each of the plurality of base stations, including:

a number of times of performance total part totaling number of times of performance of uncontrolled hand over performed by a mobile terminal between base stations of which neighboring information are not registered, and a neighboring information registration part registering serving base station and target base station which are in state of the uncontrolled hand over automatically as the neighboring information.

Another exemplary aspect of the invention is a neighboring information management system including:

the neighboring information management apparatus.

Another exemplary aspect of the invention is a method for a neighboring information management apparatus situated at higher position than a plurality of base stations and obtains a message from each of the plurality of base stations, the neighboring information management apparatus including:

totaling number of times of performance of uncontrolled hand over performed by a mobile terminal between base stations of which neighboring information are not registered, and registering serving base station and target base station which are in state of the uncontrolled hand over automatically as the neighboring information.

Another exemplary aspect of the invention is a recording medium recorded a program performed by a central processing unit in a neighboring information management apparatus, of a method for a neighboring information management apparatus situated at higher position than a plurality of base stations and obtains a message from each of the plurality of base stations, the program including:

totaling number of times of performance of uncontrolled hand over performed by a mobile terminal between base stations of which neighboring information are not registered, and registering serving base station and target base station which are in state of the uncontrolled hand over automatically as the neighboring information.

Another exemplary aspect of the invention is a neighboring information management apparatus situated at higher position than a plurality of base stations and obtains a message from each of the plurality of base stations, including:

a number of times of performance total means totaling number of times of performance of uncontrolled hand over performed by a mobile terminal between base stations of which neighboring information are not registered, and a neighboring information registration means registering serving base station and target base station which are in state of the uncontrolled hand over automatically as the neighboring information.

BRIEF DESCRIPTION OF THE DRAWINGS

FIG. 2 is an example of a diagram which shows a storage of the total results of the neighboring information at the neighboring information management apparatus according to an exemplary embodiment of the present invention;

FIG. 3 is an example of a diagram which shows an editorial results of the neighboring information at the neighboring information management apparatus according to an exemplary embodiment of the present invention;

EXEMPLARY EMBODIMENTS

Next, exemplary embodiments of the present invention will be described with referring to drawings. First, an outline of the neighboring information management system according to an exemplary embodiment of the present invention will be described below.

The neighboring information management system according to the present invention is, in a field of WiMAX (World Interoperability for Microwave Access), to total the number of times of performance of Uncontrolled hand over (HO) performed by a mobile terminal between base stations of which neighboring information are not registered, and to register serving base station and target base station which are in state of the Uncontrolled HO automatically as the neighboring information. Then the system according to the present invention has an effect to decrease the Uncontrolled HO.

In addition, the system according to the present invention has another effect to analysis the tendency of the user of the mobile terminal by totaling the number of times of performance of Uncontrolled HO per time zone, and to raise the effect of addition of the neighboring information.

In the present invention, to solve the above-mentioned problem, the neighboring information is registered by the procedure as follows.

(1) In the neighboring information management system collects the message which is transmitted and received between the base stations is collected.

(2) The message which is transmitted and received during Uncontrolled HO from the collected message is extracted.

(3) The serving base station and the target base station of the Uncontrolled HO are extracted from the extracted message in above item (2).

(4) It is confirmed that the neighboring information is not registered in the judged base stations.

(5) It is confirmed that the number of times of performance (the number of times of occurrence) of the Uncontrolled HO exceeds the pre-determined threshold.

(6) The number of times of performance of the Uncontrolled HO is totaled per time zone.

(7) The neighboring information is added to the serving and the target base stations which meet the requirement indicated in items (4) to (6).

Figure 1:
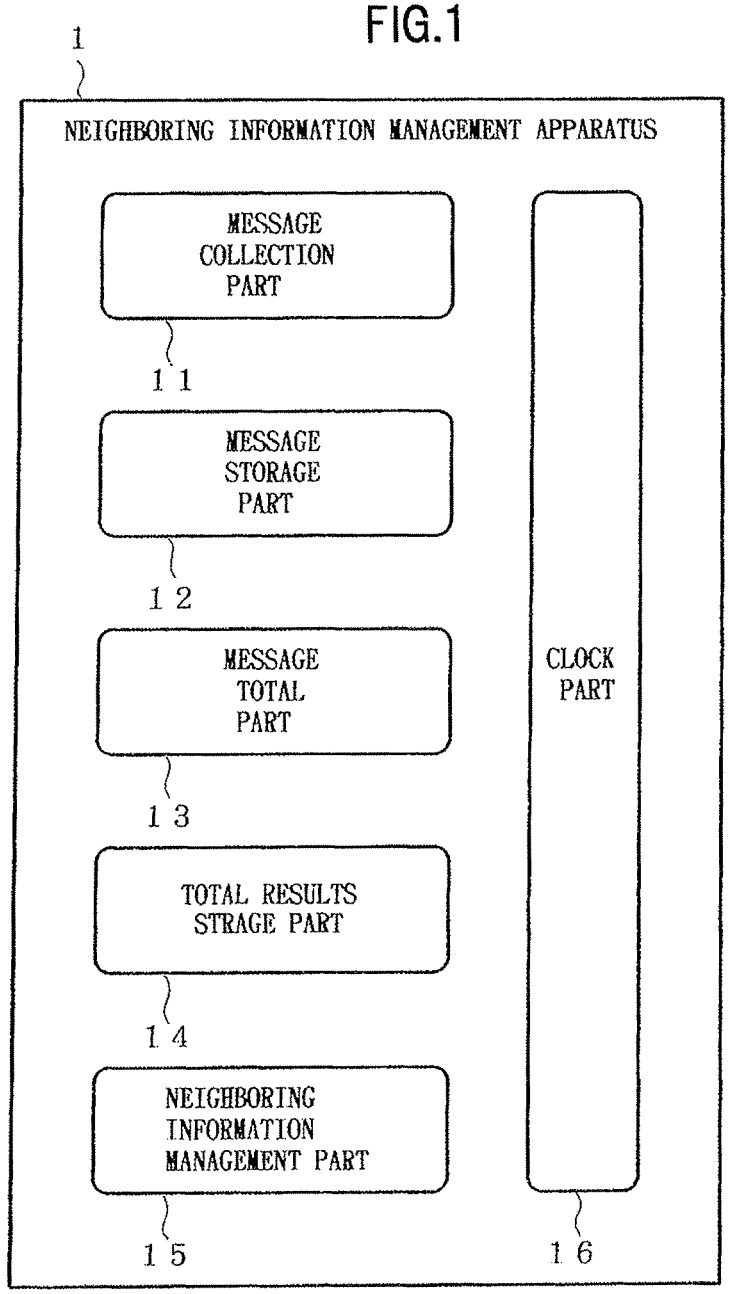
FIG. 1 is an example of a block diagram of the neighboring information management apparatus according to an exemplary embodiment of the present invention.

FIG. 1 is an example of a block diagram of the neighboring information management apparatus according to an exemplary embodiment of the present invention, FIG. 2 is an example of a diagram which shows a storage of the total results of the neighboring information at the neighboring information management apparatus according to an exemplary embodiment of the present invention and FIG. 3 is an example of a diagram which shows an editorial results of the neighboring information at the neighboring information management apparatus according to an exemplary embodiment of the present invention.

Referring to FIG. 1, the neighboring information management apparatus 1 includes a message collection part 11, a message storage part 12, a message total part 13, a total results storage part 14, a neighboring information management part 15 and a clock part 16. Then a number of times of performance total part (not shown in FIGS. 1-3) includes the parts 11-14 and 16, and a neighboring information registration part (not shown in FIGS. 1-3) includes the part 15.

The message collection part 11 collects a message transmitted and received between the base stations or between a base station and a mobile terminal. And the message collection part 11 links the collected message with time. Further the neighboring information management apparatus 1 provides an interface possible to collect a message of the base station.

The message storage part 12 stores a message transmitted and received during Uncontrolled HO of the messages collected by the message collection part 11. The message storage part 12 deletes the messages having being totaled already by the message total part 13 for reduction of load.

The message total part 13 provides a first function of extracting the neighboring information and a second function of counting a number of times of performance of Uncontrolled HO. The first function is that the mobile terminal extracts from Context-Req message the serving and the target base stations trying Uncontrolled HO and mobile information. The second function is to count a number of times of performance of Uncontrolled HO from HO-COMP (HO-COMPLETE) message of the mobile terminal which is just received after Context-Req (Context-Request) message.

The total results storage part 14 compares a threshold with the number of times of performance of Uncontrolled HO and stores a combination of the serving and the target base stations which is extracted by the message total part 13 with the number of times of performance of Uncontrolled HO per time (refer to FIG. 2).

In FIG. 2, the merit to store the number of times of performance of Uncontrolled HO per time (04:00-10:00, 10:00-16:00, 16:00-22:00, 22:00-04:00) is in grasping a characteristic of the user of the mobile terminal. The Uncontrolled HO of work-trip time zone, (for example, of 04:00-10:00 or 16:00-22:00) would have a high possibility of occurring by a movement of user. On the other hand, the other time zone (for example, of 10:00-16:00 or 22:00-04:00) would have a possibility of a user who is in a unstable radio environment (that is, a user at a fixed point) also performing the Uncontrolled HO. Therefore, the results of the work-trip time zone are registered as the neighboring information.

The neighboring information management part 15 registers a combination of the base stations which meets the requirement from the extracted serving and target base stations as the neighboring information. The neighboring information management part 15 provides a function of comparing the neighboring information, a function of storing the neighboring information and a function of editing the neighboring information.

The function of comparing judges whether or not the serving and target base stations extracted by the message total part 13 are registered as the neighboring information. The function of storing collects the neighboring information of each base station and stores the neighboring information. The function of editing edits the neighboring information of each base station (refer to FIG. 3).

Referring to FIG. 3, the neighboring information after edited (Neighbor 1, Neighbor2, Neighbor 3 and Neighbor 4) is stored in the Serving base stations (station A, station B and station C).

Referring to FIG. 3, for example, the Serving base station (station A) stores the neighboring information (Neighbor 1=station B, Neighbor 2=station C, Neighbor 3=station D, Neighbor 4=station E), the Serving base station (station B) stores the neighboring information (Neighbor 1=station A, Neighbor 2=station C, Neighbor 3=station D) and the Serving base station (station C) stores the neighboring information (Neighbor 1=station A, Neighbor 2=station B, Neighbor 3=station D, Neighbor 4=station F). Further, the base station itself may be registered as the neighboring information if each base station A-F manages a plural of cells.

The clock part 16 links the message with time to total the message between the base stations per time.

Figure 4:
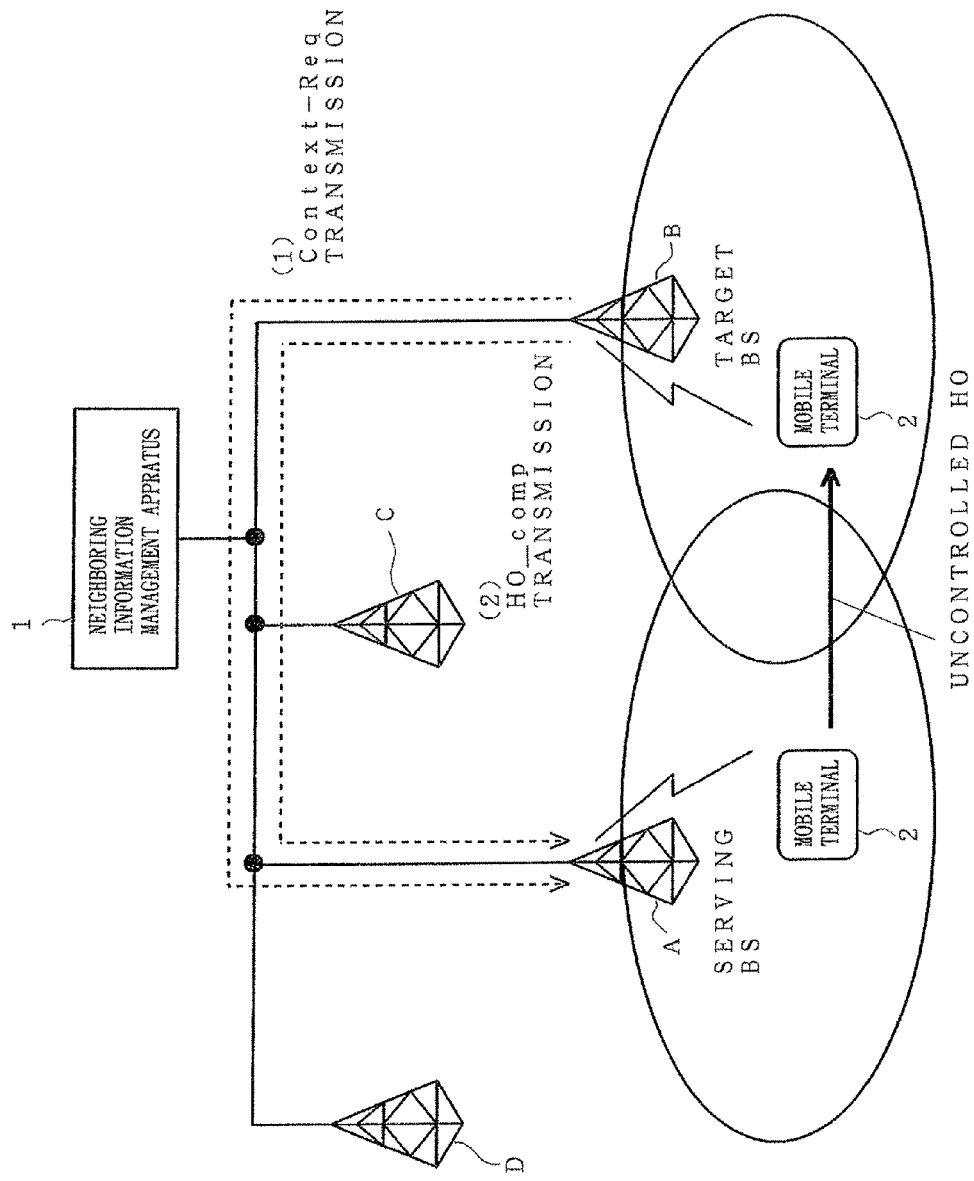
FIG. 4 is an example of a block diagram of the neighboring information management system according to an exemplary embodiment of the present invention.

FIG. 4 is an example of a block diagram of the neighboring information management system according to an exemplary embodiment of the present invention. Referring to FIG. 4, the neighboring information management system according to an exemplary embodiment of the present invention includes the neighboring information management apparatus 1, the mobile terminals 2 and the base stations A-D.

In the neighboring information management system according to an exemplary embodiment of the present invention, the neighboring information management apparatus 1 situates at higher position than the base stations A-D and obtains the message information of the base stations A-D. That is, there are a plural of base stations A-D under the neighboring information management apparatus 1 and the neighboring information management apparatus 1 obtains the message of the base stations A-D. The neighboring information management apparatus 1 provides the functions shown in FIG. 1.

Figure 5:
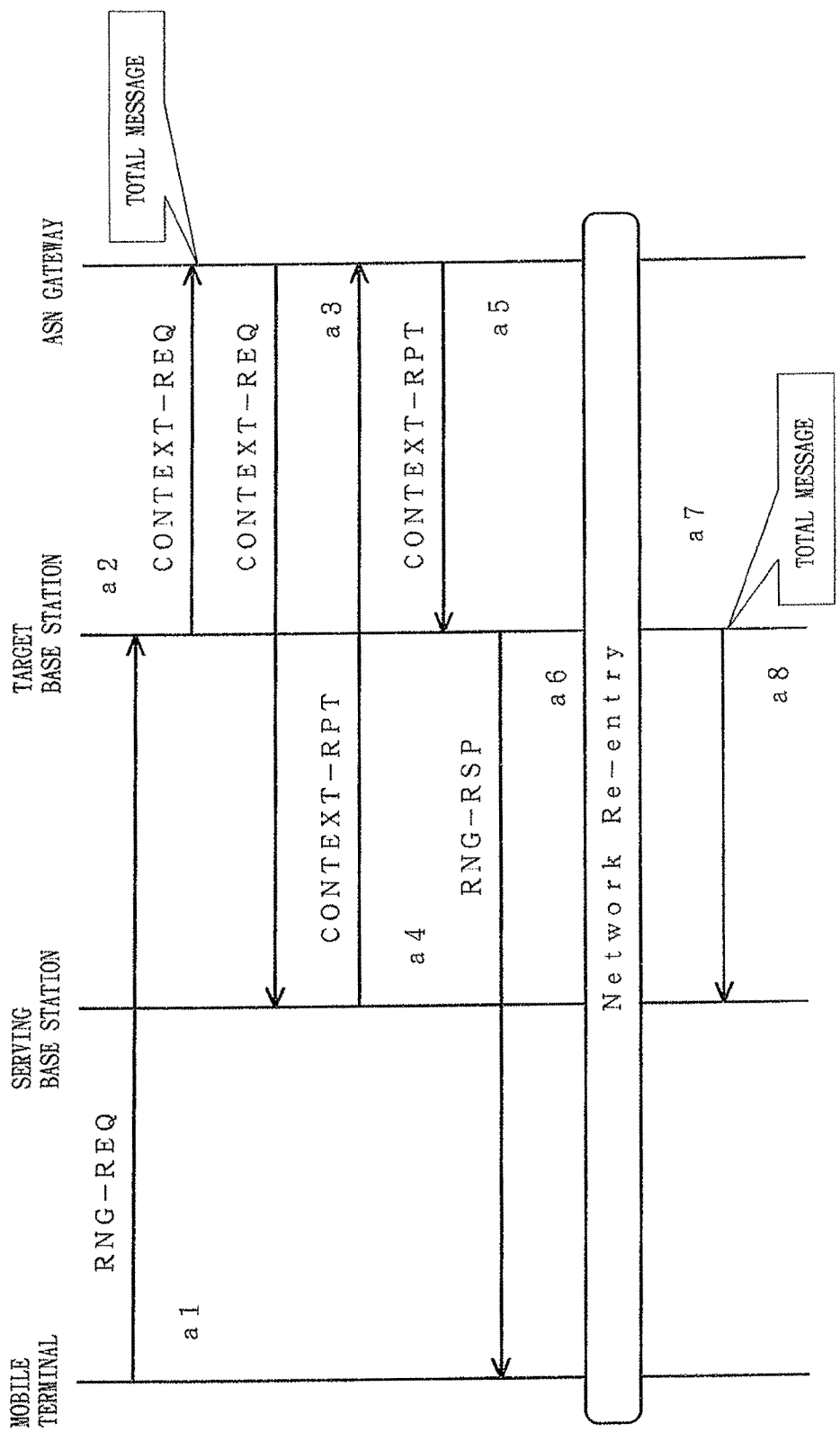
FIG. 5 is an example of a sequence chart of the operation of the neighboring information management system according to an exemplary embodiment of the present invention.
Figure 6:
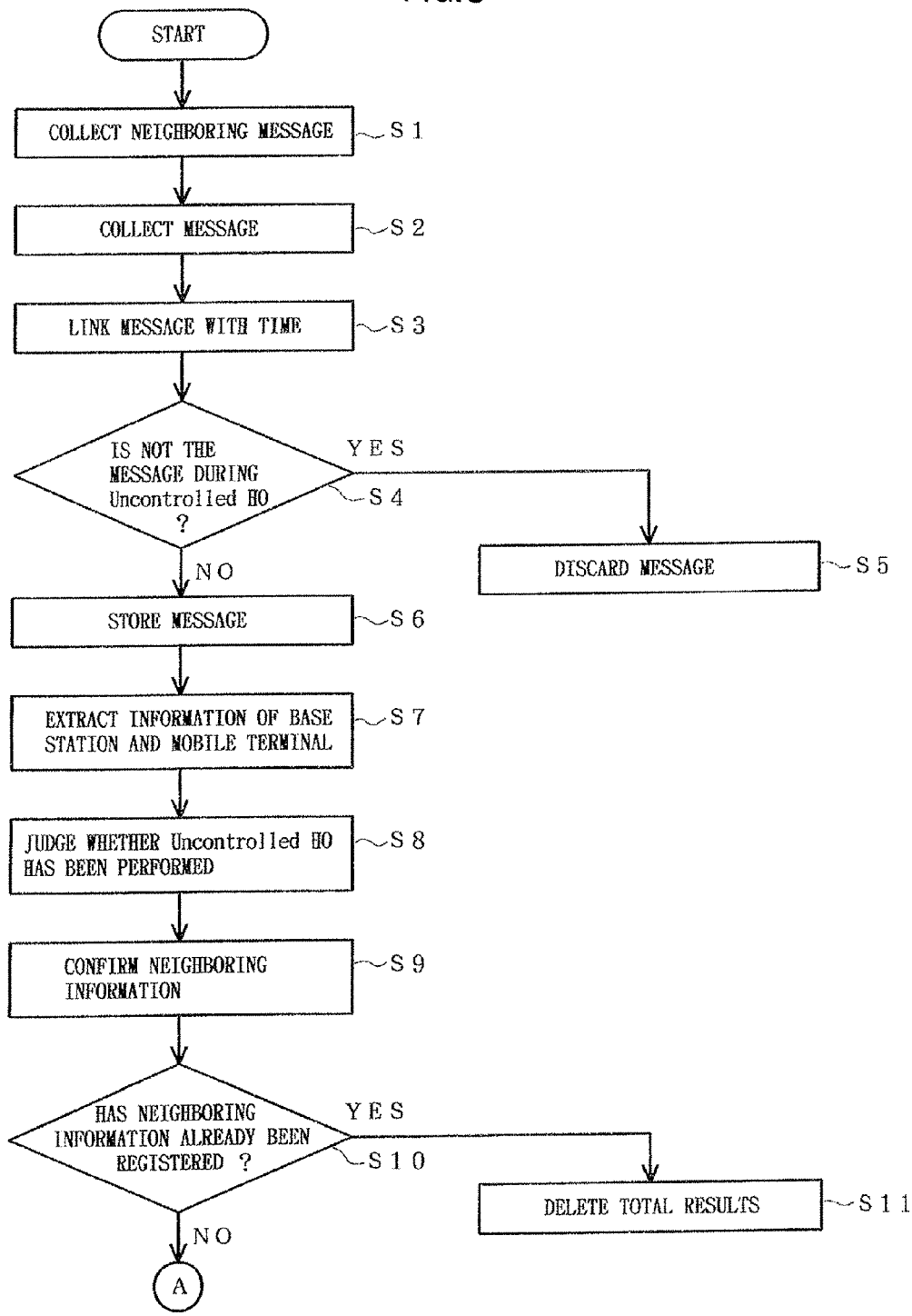
FIGS. 6 and 7 are the examples of flow charts of the operation of the neighboring information management system according to an exemplary embodiment of the present invention.
Figure 7:
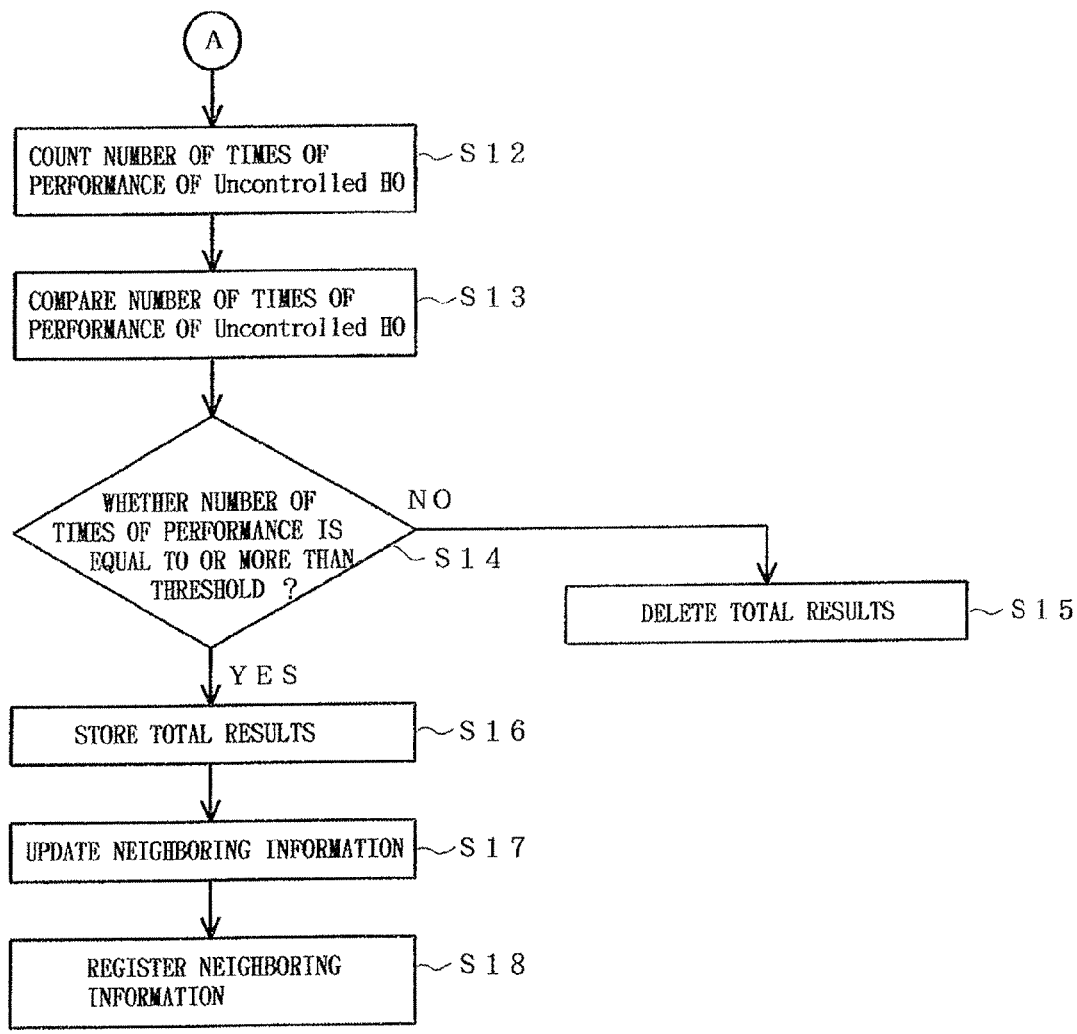

FIG. 5 is an example of a sequence chart of the operation of the neighboring information management system according to an exemplary embodiment of the present invention and FIGS. 6 and 7 are the examples of a flow chart of the operation of the neighboring information management system according to an exemplary embodiment of the present invention. Hereinafter, an operation of the neighboring information management system according to an exemplary embodiment of the present invention will be described. Further, the procedure and the operation shown in FIGS. 6 and 7 are possible to realize by CPU (Central Processing Unit) not shown in any diagrams performing the program stored in the memory not shown in any diagrams.

As a precondition, in the operation of the neighboring information management system according to an exemplary embodiment of the present invention, the message between the objective base stations and between the base station and the mobile terminal are configured to be obtained.

The neighboring information management apparatus 1 inquires the base stations A-D under the system, collects the neighboring information of the base stations A-D under the system (step S1 in FIG. 6) and stores the neighboring information in the neighboring information management part 15.

The message collection part 11 in the neighboring information management apparatus 1 collects the message between the base stations and the message between the base station and the mobile terminal respectively from the base stations A-D under the system (step S2 in FIG. 6).

The neighboring information management apparatus 1 links the collected message with the transmission and reception time of the message (step S3 in FIG. 6). In that case, the neighboring information management apparatus 1 discards the message (step S5 in FIG. 6) if the collected message is not the message transmitted and received during Uncontrolled HO (step S4 in FIG. 6).

The neighboring information management apparatus 1 stores message with the message storage part 12 if the message is one transmitted and received during Uncontrolled HO (steps S4 and S6 in FIG. 6) or another transmitted from the target base station to the serving base station when HO-COMP completed. The above-mentioned message transmitted and received during Uncontrolled HO is one transmitted from the base station without HO preparation phase (a hand over preparation phase) to the mobile terminal trying CONTEXT_REQ message for inquiring the terminal information.

FIG. 5 is a sequence chart showing a sequence of the Uncontrolled HO. In FIG. 5, when RNG-REQ is transmitted from the mobile terminal to the target base station (a1 in FIG. 5), the target base station transmits CONTEXT_REQ to ASN (Access Service Network) gateway (a2 in FIG. 5). Here, the ASN gateway performs a connection control of WiMax terminal, a control of QoS (Quality of Service), a mediation of an authentication or a relay or a buffer of the user's data and so on.

The ASN gateway transmits the CONTEXT_REQ to the Serving base station (a3 in FIG. 5). When the ASN gateway receives CONTEXT_RPT (CONTEXT_Report) from the Serving base station (a4 in FIG. 5), the ASN gateway transmits the CONTEXT_RPT to the target mobile station (a5 in FIG. 5). Here, the ASN gateway manages the CONTEXT_RPT transmitted from the Target base station as a total message.

When the target base station receives the CONTEXT_RPT from the ASN gateway, it transmits RNG-RSP (Ranging Response) to the terminal station (a6 in FIG. 5). Then the terminal station, the Serving base station, the Target base station and the ASN gateway become Network Re-entry (a7 in FIG. 5).

The message total part 13 in the neighboring information management apparatus 1 extracts the serving base station (BSID) and the target base station (BSID) with which the mobile terminal is trying the Uncontrolled HO, and the terminal information (MAC (Media Access Control) address) from the CONTEXT-REQ message (step S7 in FIG. 6).

The message total part 13 in the neighboring information management apparatus 1 judges whether or not the Uncontrolled HO has been performed by the serving base station and the target base station which the message total part 13 extracted (step S8 in FIG. 6). Here, the message total part 13 judges that the Uncontrolled HO has been performed when the serving base station receiving CONTEXT-REQ message receives HO-COMP message from the target base station just after it receives the CONTEXT-REQ message.

The neighboring information management apparatus 1 confirms whether or not the serving base station and the target base station with which the mobile terminal 2 performed the Uncontrolled HO are established as the neighboring information (step S9 in FIG. 6). The neighboring information management apparatus 1 deletes the result of totaling (step S11 in FIG. 6) when the neighboring information has already been registered (step S10 in FIG. 6), and then it does not perform any steps after step S11.

The neighboring information management apparatus 1 forces the message total part 13 to total the number of times of performance of the Uncontrolled HO on the basis of the transmission and reception time of the CONTEXT-REQ message and the HO-COMP message (step S12 in FIG. 6).

Since the HO-COMP message is also transmitted from the target base station to the serving base station when the ordinary HO completed, the message total part 13 counts the message as the number of times of performance of the Uncontrolled HO when the message total part 13 receives the CONTEXT-REQ and the HO-COMP message from the same target base station. The neighboring information management apparatus 1 transmits the number of times of performance of the Uncontrolled HO to the total results storage part 14.

The total results storage part 14 in the neighboring information management apparatus 1 compares the number of times of performance of the Uncontrolled HO with threshold (step S13 in FIG. 6). The threshold is assumed as 100 times per a day (100 times/a day). Since the radio environment of the serving and the target base stations of which threshold are less than 100 times per a day are unstable, the number of times of performance of the Uncontrolled HO may not be reduced even after registration of the neighboring information.

The neighboring information management apparatus 1, in the above-mentioned comparison with the threshold, totals the serving and target base stations of which number of times of performance of the Uncontrolled HO are equal to or more than the threshold ("YES" of step S14 in FIG. 7) per time such as "04:00-10:00; the work-trip time zone", "10:00-16:00", "16:00-22:00; the work-trip time zone" and "22:00-04:00" (step S15 in FIG. 7).

The neighboring information management apparatus 1 updates the neighboring information collected from the base stations A-D on the basis of the above-mentioned result of totaling (step S16 in FIG. 7). Since the number of the establishment of the neighboring information has the upper limit, the order of priority is added to the newly registered neighboring information according to the following requirement (step S17 in FIG. 7).

The requirement of the order of priority is as follows.

(1) The base station in which the number of times of performance of the Uncontrolled HO in the work-trip time zone is large and the number of times of performance of the Uncontrolled HO in a day is large, by the result of the totaling of the Uncontrolled HO.

(2) The base station in which the number of times of performance of the Uncontrolled HO in the work-trip time zone is large and the number of times of performance of the Uncontrolled HO in a day is small, by the result of the totaling of the Uncontrolled HO.

(3) The base station in which the number of times of performance of the Uncontrolled HO in the work-trip time zone is small and the number of times of performance of the Uncontrolled HO in a day is large, by the result of the totaling of the Uncontrolled HO.

(4) The base station in which the number of times of performance of the Uncontrolled HO in the work-trip time zone is small and the number of times of performance of the Uncontrolled HO in a day is small, by the result of the totaling of the Uncontrolled HO.

In this case, the order of priority is assumed as (1)>(2)>(3)>(4). The number of times of performance is compared with the candidate base station of the registration of the neighboring information (the target base station) on the basis of the result of totality, not by the comparison of the absolute number, and not by the above-mentioned comparison of the number of times of performance of the Uncontrolled HO.

The neighboring information management part 15 in the neighboring information management apparatus 1 informs the above-mentioned updated neighboring information to the base stations A-D and updates the neighboring information of the base stations A-D (step S18 in FIG. 7).

As mentioned above, an exemplary advantage according to the exemplary embodiment is that the neighboring information which could not be registered at the time of plan can be extracted and registered. Further, another exemplary advantage according to the exemplary embodiment is that since it is possible to establish the neighboring information by using the information of the Uncontrolled HO, it is not necessary to obtain the data of the mobile terminal 2 by the field run and it is possible to obtain the data effectively. In addition, another exemplary advantage according to the exemplary embodiment is that it is possible to detect the omission of the registration of the neighboring information.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A neighboring information management apparatus situated at higher position than a plurality of base stations and obtains a message from each of said plurality of base stations, comprising:
   a number of times of performance total part totaling number of times of performance of uncontrolled hand over performed by a mobile terminal between base stations of which neighboring information are not registered, and
   a neighboring information registration part registering serving base station and target base station which are in state of said Uncontrolled HO automatically as said neighboring information.

2. The neighboring information management apparatus according to claim 1, wherein
   said number of times of performance total part, comprising:
   a message collection part collecting massage transmitted or received by said base stations,
   a message extraction part extracting messages which are transmitted or received during said uncontrolled hand over from said collected massage, a base station extraction part extracting said serving base station and target base station which are in state of said uncontrolled hand over from said extracted messages, a first confirmation part confirming said extracted base station not being registered as said neighboring information, a second confirmation part confirming said number of times of performance of uncontrolled hand over being equal to or more than established threshold in advance, and wherein said neighboring information registration part adds said serving base station and target base station which meet requirement of said first and second confirmation parts to said neighboring information.

3. The neighboring information management apparatus according to claim 2, wherein said number of times of performance of uncontrolled hand over is totaled per time zone.

4. A neighboring information management system according to claim 1, comprising:

said neighboring information management apparatus.

5. A method for a neighboring information management apparatus situated at higher position than a plurality of base stations and obtains a message from each of said plurality of base stations, said neighboring information management apparatus comprising:

totaling number of times of performance of uncontrolled hand over performed by a mobile terminal between base stations of which neighboring information are not registered, and registering serving base station and target base station which are in state of said uncontrolled hand over automatically as said neighboring information.

6. The method according to claim 5, wherein said number of times of performance total part, comprising:

collecting massage transmitted or received by said base stations, extracting messages which are transmitted or received during said uncontrolled hand over from said collected massage, extracting said serving base station and target base station which are in state of said uncontrolled hand over from said extracted messages, confirming said extracted base station not being registered as said neighboring information, confirming said number of times of performance of uncontrolled hand over being equal to or more than established threshold in advance, and wherein said neighboring information registration part adds said serving base station and target base station which meet requirement of said first and second confirmation parts to said neighboring information.

7. The method according to claim 6, wherein said number of times of performance of uncontrolled hand over is collected per time zone.

8. A recording medium recorded a program performed by a central processing unit in a neighboring information management apparatus, of a method for a neighboring information management apparatus situated at higher position than a plurality of base stations and obtains a message from each of said plurality of base stations, said program comprising:

totaling number of times of performance of uncontrolled hand over performed by a mobile terminal between base stations of which neighboring information are not registered, and registering serving base station and target base station which are in state of said uncontrolled hand over automatically as said neighboring information.

9. A neighboring information management apparatus situated at higher position than a plurality of base stations and obtains a message from each of said plurality of base stations, comprising:

a number of times of performance total means totaling number of times of performance of uncontrolled hand over performed by a mobile terminal between base stations of which neighboring information are not registered, and a neighboring information registration means registering serving base station and target base station which are in state of said uncontrolled hand over automatically as said neighboring information.

\* \* \* \* \*